US011330495B1

(12) United States Patent
Jagannatha et al.

(10) Patent No.: US 11,330,495 B1
(45) Date of Patent: May 10, 2022

(54) NETWORK FALLBACK FOR MULTIMEDIA PRIORITY SERVICES

(71) Applicant: Verizon Patent and Licensing Inc., Basking Ridge, NJ (US)

(72) Inventors: Deepa Jagannatha, Bridgewater, NJ (US); Timothy M. Dwight, Richardson, TX (US); Sudhakar Reddy Patil, Flower Mound, TX (US); Andrew E. Youtz, Princeton, NJ (US); Byunghun Choi, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/073,479

(22) Filed: Oct. 19, 2020

(51) Int. Cl.
| | |
|---|---|
| *H04W 36/22* | (2009.01) |
| *H04W 4/06* | (2009.01) |
| *H04W 4/90* | (2018.01) |
| *H04W 36/00* | (2009.01) |
| *H04W 76/27* | (2018.01) |
| *H04W 76/50* | (2018.01) |
| *H04W 48/18* | (2009.01) |

(52) U.S. Cl.
CPC ............ *H04W 36/22* (2013.01); *H04W 4/06* (2013.01); *H04W 4/90* (2018.02); *H04W 36/0022* (2013.01); *H04W 36/0079* (2018.08); *H04W 76/27* (2018.02); *H04W 48/18* (2013.01); *H04W 76/50* (2018.02)

(58) Field of Classification Search
CPC ....... H04W 76/10; H04W 4/90; H04W 76/50; H04W 36/0022; H04W 48/18
See application file for complete search history.

(56) References Cited

U.S. PATENT DOCUMENTS

| | | | |
|---|---|---|---|
| 2020/0015128 A1* | 1/2020 | Stojanovski | ...... H04W 36/0022 |
| 2020/0275337 A1* | 8/2020 | Liu | ................... H04W 36/0044 |

OTHER PUBLICATIONS

3GPP TS 22.153 V17.1.0 (Dec. 2019), "3rd Generation Partnership Project; Technical Specification Group Services and System Aspects; Multimedia priority service (Release 17)" (Year: 2019).*

* cited by examiner

*Primary Examiner* — Nam T Huynh

(57) ABSTRACT

A Next Generation network device receives, from a user equipment device (UE), a Service Request for establishing a Multimedia Priority Services (MPS) session. The Next Generation network device determines whether the Service Request includes a MPS fallback request to request network fallback from a Next Generation network to a Fourth Generation (4G) network for the MPS session. The device causes, based on the Service Request including the MPS fallback request, establishment of the MPS session from the UE device via the 4G network by performing one of: a handover procedure from the Next Generation network to the 4G network, or a Radio Resource Control (RRC) redirection procedure from the Next Generation network to the 4G network.

20 Claims, 10 Drawing Sheets

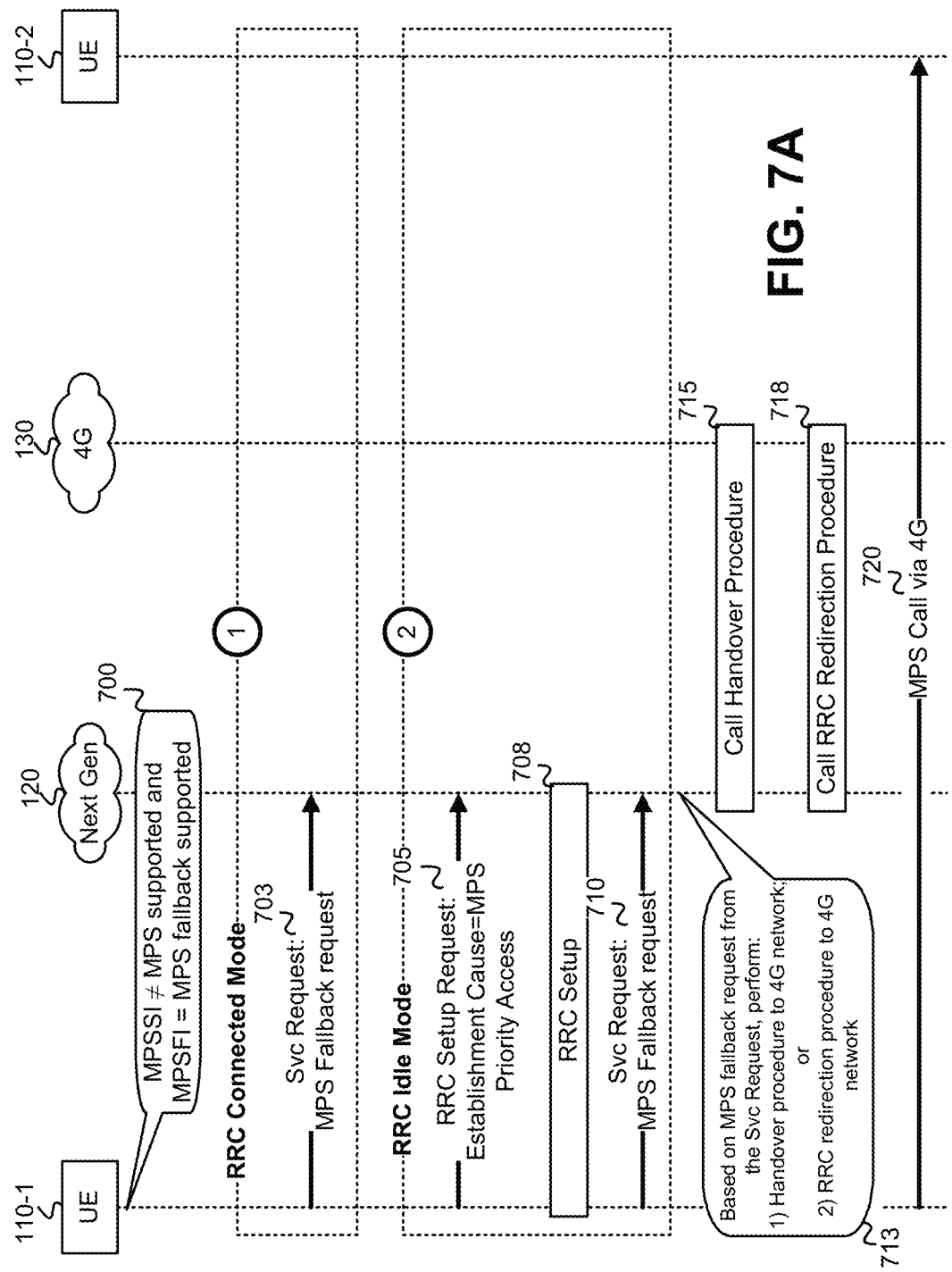

NETWORK FALLBACK FOR MULTIMEDIA PRIORITY SERVICES

BACKGROUND

Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. 5G mobile telecommunications networks may support more reliable, massive machine communications (e.g., machine-to-machine (M2M), Internet of Things (IoT)). Next Generation mobile networks are expected to enable a higher utilization capacity than current wireless networks, permitting a greater density of wireless users. Next Generation mobile networks are designed to increase data transfer rates, increase spectral efficiency, improve coverage, improve capacity, and reduce latency.

BRIEF DESCRIPTION OF THE DRAWINGS

FIGS. 7A-7C depict exemplary operations, messages, and data flows associated with the exemplary process of FIGS. 6A and 6B.

DETAILED DESCRIPTION OF THE PREFERRED EMBODIMENTS

Figure 1:
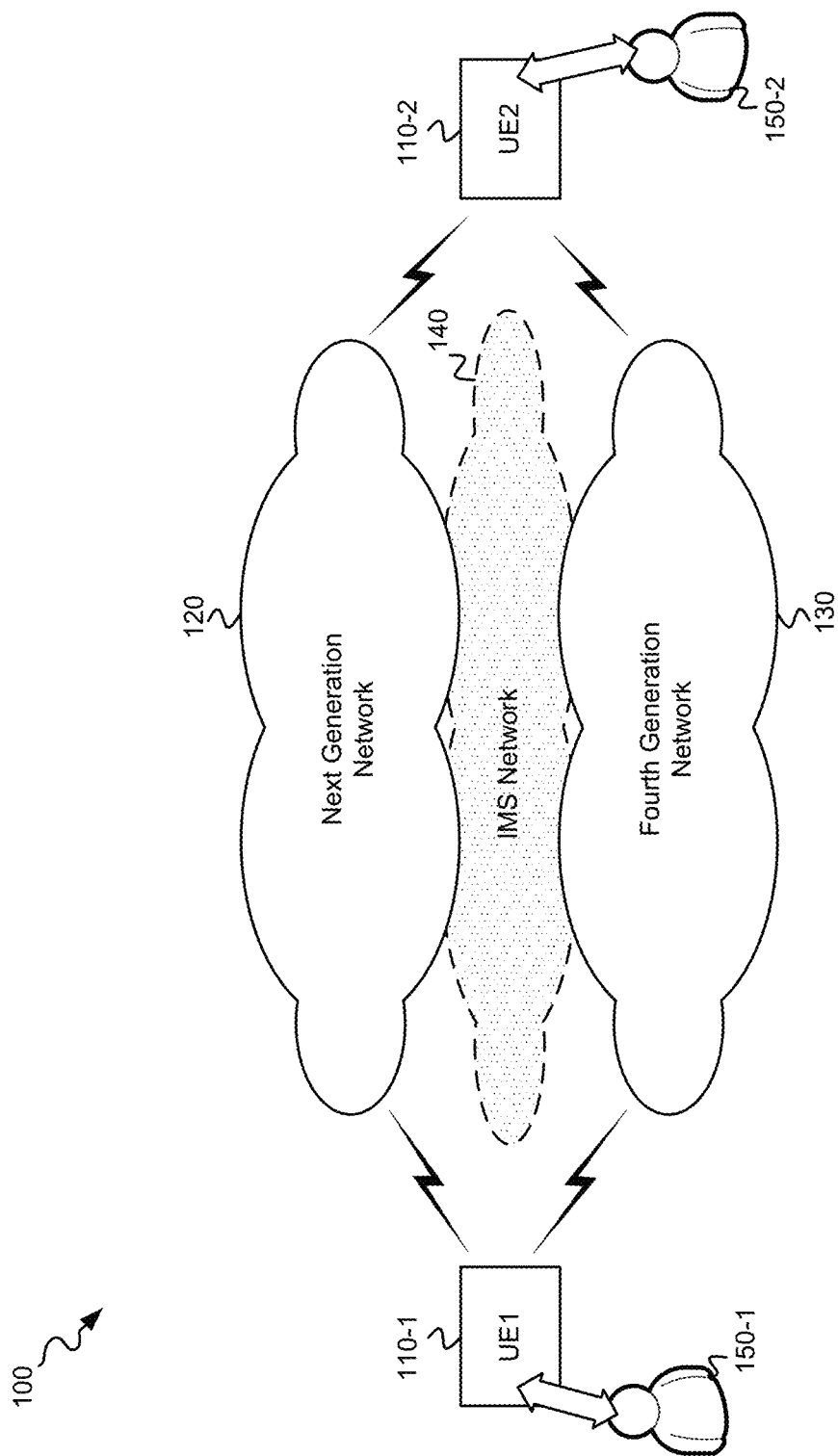
FIG. 1 depicts an exemplary network environment in which Multimedia Priority Service (MPS) fallback procedures may be implemented by a Next Generation network to enable MPS calls to be established via a Fourth Generation network.

The following detailed description refers to the accompanying drawings. The same reference numbers in different drawings may identify the same or similar elements. The following detailed description does not limit the invention.

Fourth Generation (4G) and Next Generation wireless networks are capable of interworking with one another to provide coextensive wireless service to a same geographic region. In such interworked network environments, Packet Data Unit (PDU) sessions may selectively be directed to either the Next Generation wireless network or the 4G network. When a UE first registers in the Next Generation wireless network, the UE creates an IMS PDU session and performs IMS registration and initial signaling procedures involved in setting up a voice call over the Next Generation wireless network. After registration, when a flow for voice traffic is requested by the UE, a Next Generation NodeB (gNB) of the Next Generation wireless network may decide whether the UE should be redirected to the 4G wireless network that provides wireless service to the same geographic region. If the gNB decides on redirection to the 4G network, the gNB causes existing PDU sessions for the UE to be handed over to the 4G wireless network. This process may be referred to as "Evolved Packet System (EPS) fallback" or "4G fallback."

Multimedia Priority Service (MPS) is a service currently supported by 4G networks. MPS delivers calls or sessions of a high priority nature from mobile to mobile networks, mobile to fixed networks, and fixed to mobile networks. The intention of MPS is to enable National Security (NS) or Emergency Preparedness (EP) users to conduct priority calls/sessions using public networks during network congestion. MPS users, such as NS or EP users, include government-authorized personnel, emergency management officials, and/or other authorized users. Effective emergency/disaster response and management may rely on a MPS user's ability to communicate during network congestion. Therefore, MPS users expect to receive priority treatment in support of mission critical multimedia communications (Mission Critical Services (MCS)).

MPS in the U.S. includes Wireless Priority Service (WPS) and Government Emergency Telecommunications Service (GETS). Establishment of a call/session via WPS uses the caller's subscription data and parses a dial string of the dialed number to detect a special prefix (e.g., *272). GETS authenticates the caller using an authentication server that requests and validates the caller's Personal Identification Number (PIN) and determines that a call is intended to be prioritized by matching it to a list of GETS access numbers. During establishment of a call/session with GETS, there are actually two calls: one from the caller to an authentication server, and one from the caller to the called party that is placed on the caller's behalf by the authentication server. The network determines whether to prioritize the first call, the second call, or both calls.

During MPS call establishment, a User Equipment device (UE) parses the call's dial string to identify whether the dialed digits begin with a WPS prefix or if the digits match a GETS access number. If the dialed digits begin with a WPS prefix, and the UE verifies that the caller is subscribed to WPS, then the UE invokes priority access services when originating the call. Further, if the dialed digits match a GETS access number, the UE also invokes priority access services when originating the call. If the dialed digits do not begin with a WPS prefix or the caller is not subscribed to WPS, or the dialed digits do not match a GETS access number, then the UE places the calls as a normal, non-prioritized call.

Next Generation wireless networks, such as Fifth Generation networks, may initially be deployed without MPS support, and standards have not clearly defined fallback services when a Next Generation network does not support MPS. Exemplary embodiments described herein implement processes that enable MPS fallback, during MPS call establishment, from a Next Generation network (e.g., a Fifth Generation network) to a 4G network under certain circumstances, such as when the Next Generation network does not support MPS or when the Next Generation network is congested or overloaded.

FIG. 1 depicts an exemplary network environment 100 in which MPS fallback procedures may be implemented by a Next Generation network to enable MPS calls to be established via a 4G network. As shown, network environment 100 includes a calling UE 110-1, a called UE 110-2, a Next Generation network 120, an IMS network 140, and a 4G network 130.

UEs 110-1 and 110-2 (referred to herein as "UE 110" or "UEs 110") may each include any type of electronic device having a wireless communication capability. UE 110 may include, for example, a laptop, palmtop, desktop, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 110. For example, as shown, a first user 150-1 may operate UE 110-1 and a second user 150-2 may operate UE 110-2. UEs 110 may each execute a respective Session Initiation Protocol (SIP) user agent (UA) (not shown) that may establish connections and sessions with other UEs 110. Protocols other than SIP may be used for call control and session establishment.

Next generation network 120 includes any type of a Next Generation Mobile network that includes evolved network components (e.g., future generation components) relative to a Long-Term Evolution (LTE) network, such as a 4G or 4.5G mobile network. In one implementation, Next Generation Mobile network 120 may include a 5G mobile network.

IMS network 140 includes a network that uses SIP for voice and multimedia session control, such as for creating, modifying, and terminating sessions between devices (e.g., between UEs 110-1 and 110-2). 4G network 130 includes any type of a Public Land Mobile Network (PLMN) that implements a Long-Term Evolution (LTE) mobile telecommunications standard, such as the 4G or 4.5G LTE standard.

The configuration of network components of network environment 100 is shown in FIG. 1 is for illustrative purposes. Other configurations may be implemented. Therefore, network environment 100 may include additional, fewer, and/or different components that may be configured in a different arrangement than that depicted in FIG. 1. For example, network environment 100 may include numerous UEs (e.g., UEs 110-1 through 110-x, where x>2). Further, network environment 100 may include additional networks not shown in FIG. 1. For example, Next Generation network 120 and 4G network 130 may connect to one or more other types of networks, such as, for example, local area networks (LANs), wide area networks (WANs), metropolitan area networks (MANs), Public Switched Telephone Networks (PSTNs), and/or the Internet. Though distinct Next Generation and 4G networks 120 and 130 are shown in FIG. 1, Next Generation network 120 and 4G network 130 may be combined as a single hybrid Next Generation/4G network that includes certain components of both a Next Generation network and a 4G network.

Figure 2:
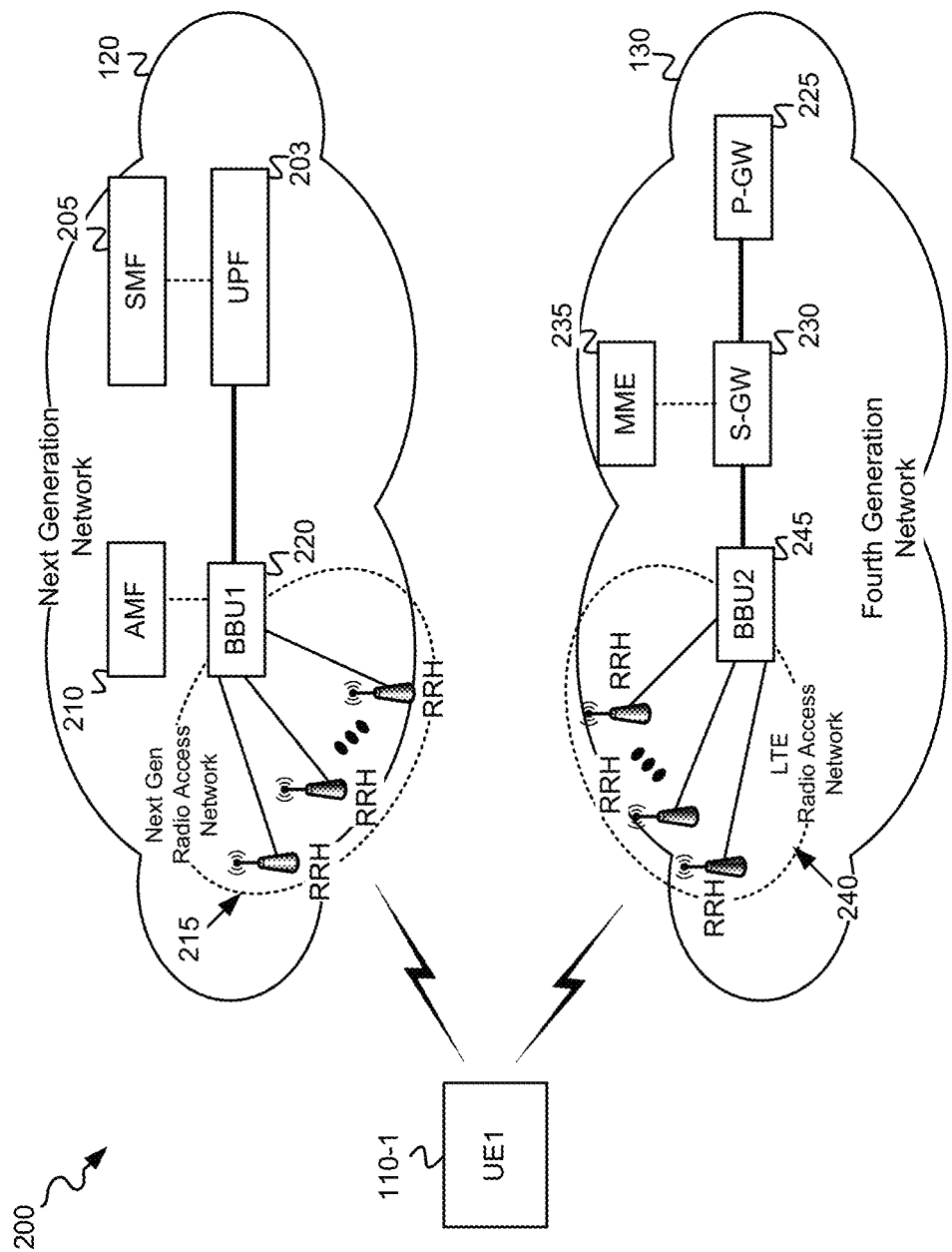
FIG. 2 depicts details of an exemplary portion of the network environment of FIG. 1 that includes a Next Generation Mobile network and a Fourth Generation network.

FIG. 2 depicts details of an exemplary portion 200 of network environment 100 of FIG. 1 that includes Next Generation Mobile network 120 and 4G network 130. In the portion 200 shown in FIG. 2, Next Generation Mobile network 120 includes, among other nodes or functions, a User Plane Function (UPF) 203, a Session Management Function (SMF) 205, an Access and Mobility Management Function (AMF) 210, and a Next Generation Radio Access Network (RAN) 215.

UPF 203 includes, or is executed by, a network device that acts as a router and a gateway between Next Generation Mobile network 120 and an external packet data network (not shown), and forwards session data between the external packet data network and a base band unit in Next Generation Mobile network 120. Next Generation Mobile network 120 may include multiple UPFs 203 disposed at various geographic locations in network 120. SMF 205 includes, or is executed by, a network device that performs session management, allocates network addresses to UEs 110, and selects and controls the UPF device 203 for data transfer. AMF 210 includes, or is executed by, a network device that performs UE-based authentication, authorization, and mobility management for UEs 110.

As shown in FIG. 2, Next Generation Radio Access Network (RAN) 215 may include a first base band unit (BBU1) 220 and multiple remote radio heads (RRHs). In some implementations, BBU1 220 may further include a Central Unit (CU) and one or more Distributed Units (DUs) (not shown). Next Generation RAN 215 may also include one or more additional base band units (BBUs) and RRHs, and other wireless nodes, functions, and components, not shown in FIG. 2. BBU1 220 may connect to the multiple RRHs via, for example, optical fibers. BBU1 220 includes a network device that operates as a digital function unit that transmits digital baseband signals to the multiple RRHs, and receives digital baseband signals from the multiple RRHs. If BBU1 220 is connected to the multiple RRHs via, for example, optical fibers, then BBU1 220 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU1 220 via an optical fiber, the RRHs may convert received RF signals to optical signals, and transmit the optical signals to BBU1 220. Additionally, the RRHs may receive optical signals from BBU1 220 via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If Next Generation Mobile network 120 is a 5G New Radio (NR) network, BBU1 220 and a RRH represent a distributed Next Generation NodeB, which may also be referred to as a "gNB," or an enhanced LTE (eLTE) eNB that can connect to Next Generation Mobile network 120.

As further shown in the network portion 200 of FIG. 2, 4G network 130 includes, among other functions or nodes, a Packet Gateway (P-GW) 225, a Serving Gateway (S-GW) 230, a Mobility Management Entity (MME) 235, and an LTE RAN 240.

Packet Gateway (P-GW) 225 includes, or is executed by, a network device that acts as a router and a gateway between 4G network 130 and the external packet data network (not shown), and forwards session data between the packet data network and a base band unit in 4G network 130. Serving Gateway (S-GW) 230 includes, or is executed by, a network device that routes and forwards session data between P-GW 225 and a LTE RAN 240 serving the session's destination UE 110.

Mobility Management Entity (MME) 235 includes, or is executed by, a network device that acts as a control entity for 4G network 130, including communicating with a HSS (not shown in FIG. 2) of 4G network 130 for user/device authentication and for user/device profile download. MME 235 further provides UEs 110 with mobility management and session management functions using, for example, Network Access Stratum (NAS) signaling.

LTE RAN 240 may include a second base band unit (BBU2) 245 and multiple remote radio heads (RRHs). In some implementations, BBU2 245 may further include a Central Unit (CU) and one or more Distributed Units (DUs) (not shown). LTE RAN 240 may include one or more additional base band units (BBUs) and RRHs, and other wireless nodes, functions, and components, not shown in FIG. 2. BBU2 245 may connect to the multiple RRHs via, for example, optical fibers. BBU2 245 includes a network device that operates as a digital function unit that transmits digital baseband signals to the multiple RRHs and receives digital baseband signals from the multiple RRHs. If BBU2 245 is connected to the multiple RRHs via, for example, optical fibers, then BBU2 245 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU2 245 via an optical fiber, the RRHs may convert received RF signals to optical signals, and transmit the optical signals to BBU2 245. Additionally, the RRHs may receive optical signals from BBU2 245 via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. In 4G network 130, BBU2 245 and a RRH represent a distributed evolved NodeB (eNB).

FIG. 2 illustrates an exemplary implementation of the configuration of the components of Next Generation network 120 and 4G network 130. Other components and configurations of Next Generation network 120 and 4G network 130 may, however, be implemented. Therefore, Next Generation network 120 and 4G network 130 may each include additional, fewer, and/or different components, that may be configured differently, than depicted in FIG. 2 and described herein. For example, though only a single base band unit BBU1 220, and a single base band unit BBU2 245, are shown as components of Next Generation RAN 215 and LTE RAN 240, respectively, each of Next Generation RAN 215 and LTE RAN 240 may include multiple base band units (i.e., >1 base band unit), with each of the multiple base band units further connecting to at least one RRH. As another example, though only a single AMF 210, SMF 205, and UPF 203 is shown in Next Generation network 120, and only a single MME 235, S-GW 230 and P-GW 225 is shown in 4th Generation network 130, multiple ones of each of these network function may reside in networks 120 and 130.

Figure 3:
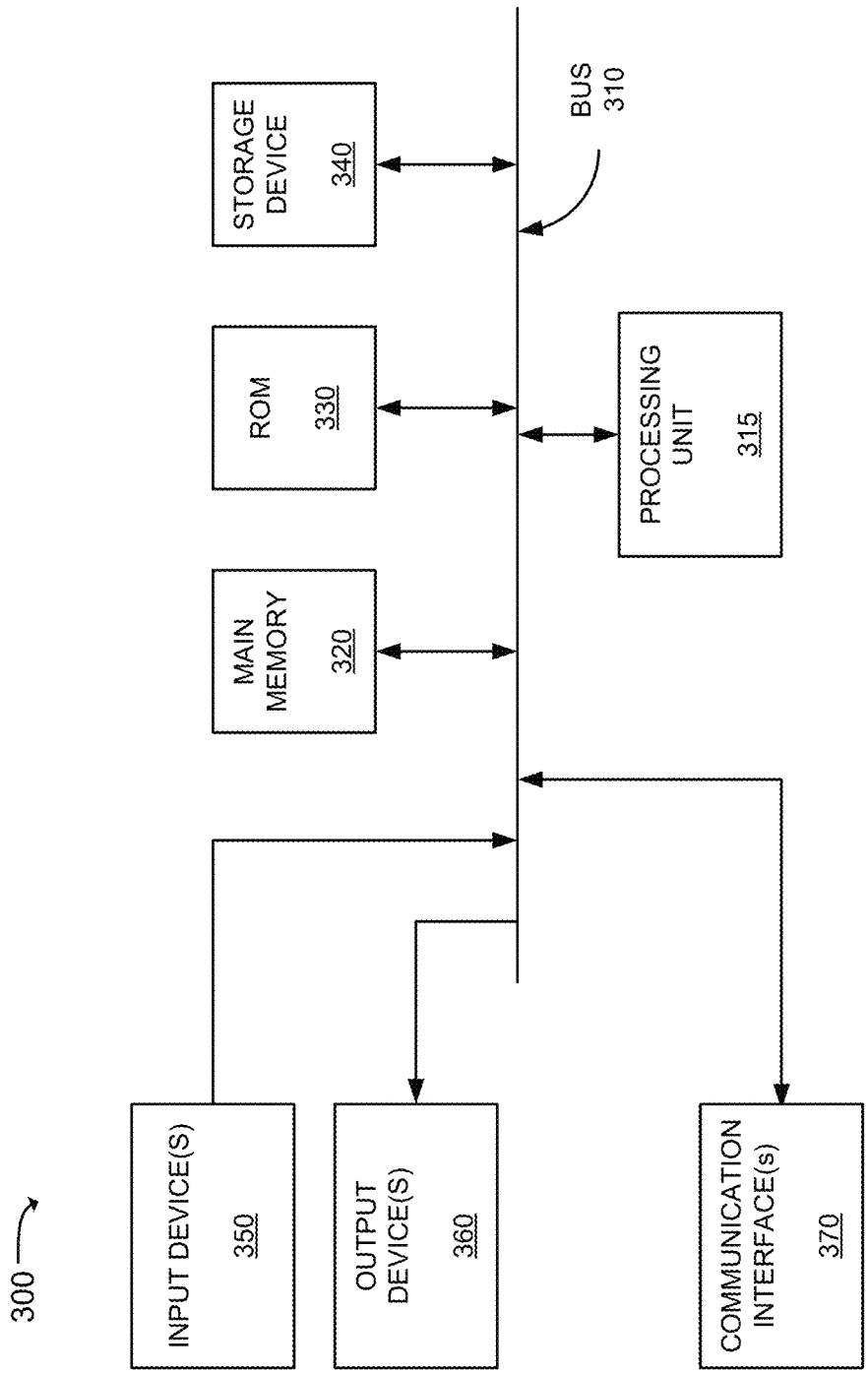
FIG. 3 is a diagram that depicts exemplary components of a device that may correspond to the devices, or which may execute functions, that are depicted in FIGS. 1 and 2.

FIG. 3 is a diagram that depicts exemplary components of a device 300. UEs 110 and devices implementing (or executing functions associated with) UPF 203, SMF 205, AMF 210, BBU 220, P-GW 225, S-GW 230, MME 235, and BBU 245 may be similarly configured. Device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium," "non-transitory computer-readable medium," or "non-transitory storage medium." In some implementations, the processes/methods set forth herein can be implemented as instructions that are stored in main memory 330, ROM 340 and/or storage device 350 for execution by processing unit 320.

Input device 360 may include one or more mechanisms that permit an operator to input information into device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables device 300 to communicate with other devices and/or systems. For example, communication interface(s) 380 may include wired or wireless transceivers for communicating via networks 120 and/or 130.

The configuration of components of device 300 illustrated in FIG. 3 is for illustrative purposes. Other configurations may be implemented. Therefore, device 300 may include additional, fewer and/or different components than those depicted in FIG. 3.

Figure 4:
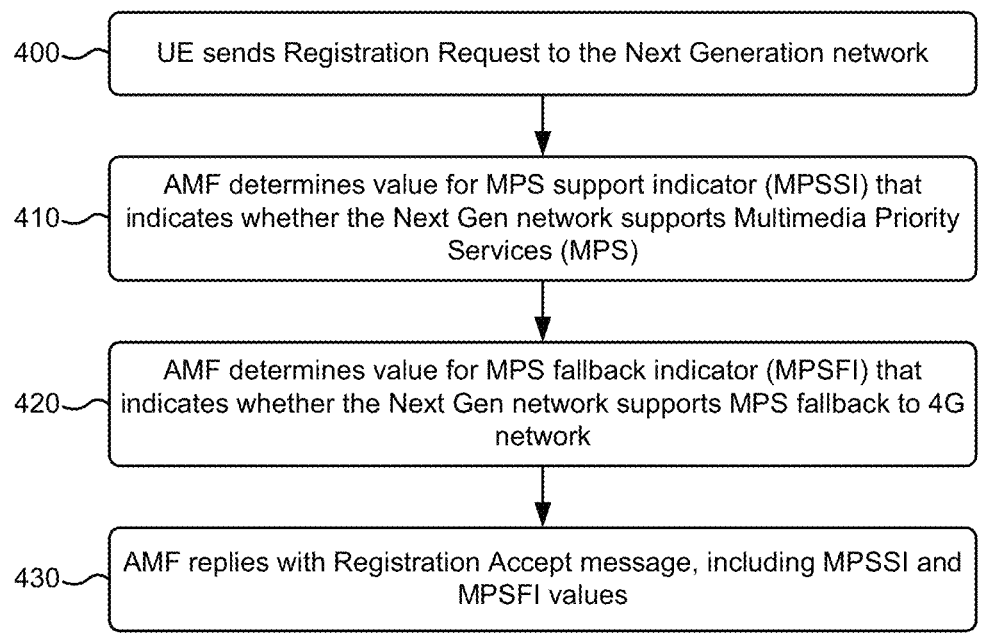
FIG. 4 is a flow diagram of an exemplary process for registration of a user equipment device (UE) with the Next Generation network of FIG. 1 and for the Next Generation network supplying MPS support information and/or MPS fallback information to the registering UE.

FIG. 4 is a flow diagram of an exemplary process for registration of a UE 110 with Next Generation network 120 and for network 120 supplying MPS support information and/or MPS fallback information to the registering UE 110. The exemplary process of FIG. 4 may be implemented by an AMF 210, or by another node/function in Next Generation network 120, in conjunction with a UE 110 that is registering with the network 120. The exemplary process of FIG. 4 is described below with reference to the exemplary messaging/operations/data flow diagram of FIG. 5. The exemplary process of FIG. 4 may be repeated each time a UE 110 registers with Next Generation network 120 to receive mobile network services.

Figure 5:
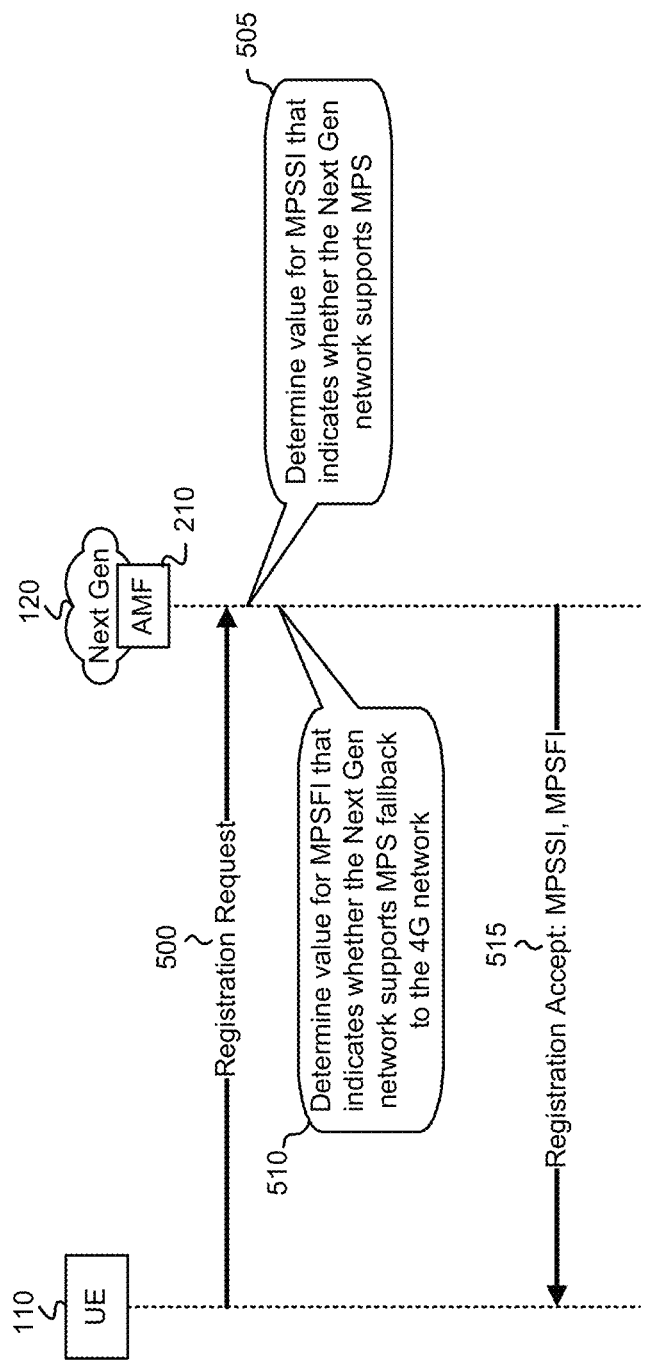
FIG. 5 depicts exemplary operations, messages, and data flows associated with the exemplary process of FIG. 4.

The exemplary process may include a UE 110 sending a Registration Request to the Next Generation network 120 (block 400). Upon powering up of UE 110, or UE 110 moving into a wireless coverage area covered by Next Generation network 120, UE 110 may send a Registration Request over RAN 215 of Next Generation network 120 to request registration and wireless service by network 120. FIG. 5 depicts UE 110 sending a Registration Request 500 to Next Generation network 120.

Upon receipt of the Registration Request, AMF 210 of Next Generation network 120 determines a value for a MPS support indicator (MPSSI) that indicates whether the Next Generation network 120 supports MPS (block 410). AMF 210 maintains knowledge of whether Next Generation network 120 currently supports MPS calls/sessions. If AMF 210 determines that network 120 supports MPS, then AMF 210 may set the MPSSI to indicate that MPS is supported. If AMF 210 determines that network 120 does not support MPS, then AMF 210 may set the MPSSI to indicate that MPS is not supported. In one implementation in which Next Generation network 120 includes a 5G network, the MPSSI may include two bits and may be set as follows:

| MPSSI Bits | | |
| --- | --- | --- |
| 2 | 1 | |
| 0 | 0 | MPS not supported |
| 0 | 1 | MPS supported in New Radio (NR) connected to 5G Core Network (5GCN) only |
| 1 | 0 | MPS supported in Evolved Universal Terrestrial Radio Access (E-UTRA) connected to 5GCN only |
| 1 | 1 | MPS supported in NR connected to 5GCN and E-UTRA connected to 5GCN |

FIG. 5 shows AMF 210 of Next Generation network 120 determining 505 a value for the MPSSI that indicates whether the Next Generation network 120 supports MPS.

AMF 210 further determines a value for a MPS fallback indicator (MPSFI) that indicates whether the Next Generation network 120 supports MPS fallback to 4G network 130 (block 420). AMF 210 also maintains knowledge of whether Next Generation network 120 currently supports network fallback for MPS calls/sessions to 4G network 130. If AMF 210 determines that network 120 supports MPS fallback, then AMF 210 may set the MPSFI to indicate that MPS fallback is supported. If AMF 210 determines that network 120 does not support MPS fallback, then AMF 210 may set the MPSFI to indicate that MPS fallback is not supported. In one implementation in which Next Generation network 120 includes a 5G network, the MPSFI may include two bits and may be set as follows:

| MPSFSI Bits | | |
| --- | --- | --- |
| 2 | 1 | |
| 0 | 0 | MPS fallback not supported |
| 0 | 1 | MPS fallback supported in NR connected to 5GCN only |
| 1 | 0 | MPS supported in Evolved Universal Terrestrial Radio Access (E-UTRA) connected to 5GCN only |
| 1 | 1 | MPS supported in NR connected to 5GCN and E-UTRA connected to 5GCN |

FIG. 5 shows AMF 210 of Next Generation network 120 determining 510 a value for the MPSFI that indicates whether the Next Generation network 120 supports MPS fallback to the 4G network 130.

AMF 210 replies to the Registration Request with a Registration Accept message that includes the MPSSI determined in block 410 and the MPSFI determined in block 420 (block 430). AMF 210 generates a Registration Request Accept message according to standard procedures and additionally inserts the MPSSI and MPSFI bits into an available area of an information element (IE) of the Registration Request Accept message. In one implementation, the two bits of the MPSSI may be inserted into octet 5, bits 1 and 2 of the IE of the Registration Request Accept Message, and the two bits of the MPSFI may be inserted into octet 5, bits 3 and 4 of the IE of the Registration Request Accept message. Upon receipt of the Registration Request Accept message, the registering UE 110 may retrieve the MPSSI and MPSFI bits from the IE of the message to identify whether the Next Generation network 120 does or does not support MPS and whether the Next Generation network 120 does or does not support MPS fallback. UE 110 may store the MPSSI and MPSFI bits in a location in memory from which the bits may be consulted to determine whether Next Generation network 120 supports MPS or supports MPS fallback. FIG. 5 shows AMF 210 of Next Generation network 120 returning a Registration Accept message 515 to the registering UE 110, where the message 515 includes the MPSSI and MPSFI.

Figure 6A:
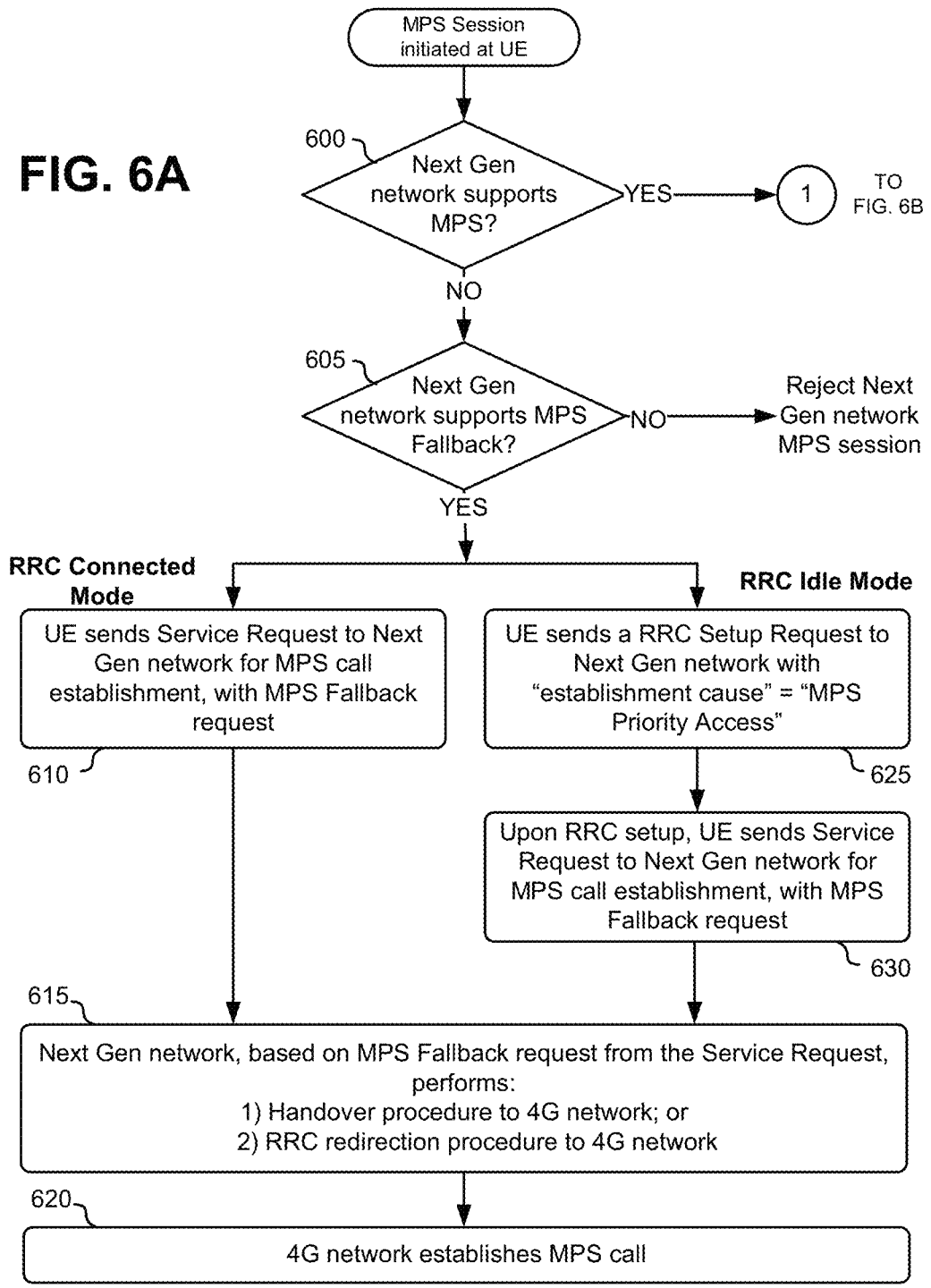
FIGS. 6A and 6B are flow diagrams of an exemplary process for implementing the fallback of MPS calls from the Next Generation network to the Fourth Generation network of FIG. 1.
Figure 6B:
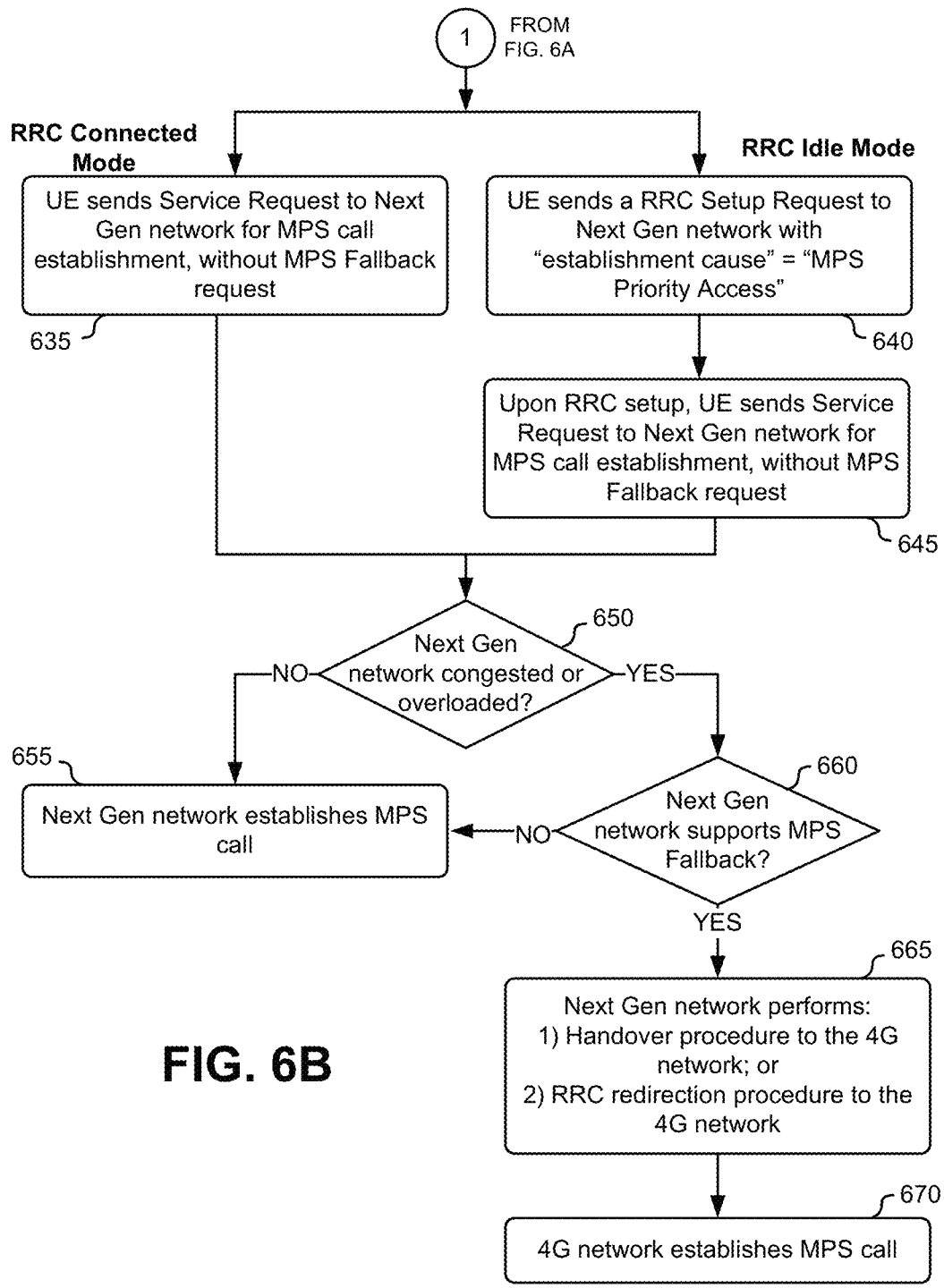

FIGS. 6A and 6B are flow diagrams of an exemplary process for implementing the fallback of MPS calls from Next Generation network 120 to 4G network 130. The exemplary process of FIGS. 6A and 6B may be implemented by a UE 110 in conjunction with one or more nodes/functions in Next Generation network 120 and 4G network 130. The exemplary process of FIGS. 6A and 6B may be repeated each time an MPS call/session is initiated at a UE 110.

The exemplary process may include UE 110 determining if the Next Generation network 120, to which UE 110 previously registered in the process of FIG. 4 above, supports MPS (block 600). A user 150 at a UE 110 may initiate an MPS call/session by dialing an appropriate access number. In the case of a WPS call/session, the user 150 may dial a WPS prefix (e.g., *272) in addition to the dialed called number to initiate a WPS call/session. In the case of a GETS call/session, the user 150 may dial a GETS access number (e.g., 800-900-4387 for Verizon) to initiate a GETS call/session. Upon initiation of an MPS call/session, UE 110 may retrieve the MPSSI bits, stored in block 430 of FIG. 4 above, and determine, based on the MPSSI, whether Next Generation network 120 supports MPS. For example, if the stored bits of MPSSI equal "0 0," then Next Generation network 120 does not support MPS. As another example, if the stored bits of MPSSI equal "0 1," then Next Generation network 120, which includes a NR RAN 215 connected to a 5GCN, supports MPS.

If Next Generation network 120 does not support MPS (NO—block 600), then UE 110 determines if the Next Generation network 120 supports MPS fallback (block 605). UE 110 may retrieve the MPSFI bits, stored in block 430 of FIG. 4 above, and determine, based on the MPSFI, whether Next Generation network 120 supports MPS fallback. For example, if the stored bits of MPSFSI equal "0 0," then Next Generation network 120 does not support MPS fallback. As another example, if the stored bits of MPSSI equal "0 1," then Next Generation network 120, which includes a NR RAN 215 connected to a 5GCN, supports MPS fallback. If Next Generation network 120 does not support MPS fallback (NO—block 605), then UE 110 may reject the MPS call/session. UE 110, for example, may present a notification to the user 150 that the MPS call/session cannot be completed by the network.

If Next Generation network 120 supports MPS fallback (YES—block 605), and UE 110 is currently in a Radio Resource Control (RRC) connected mode, then UE 110 sends a Service Request message to Next Generation network 120 for MPS call establishment, with the Service Request message including a MPS fallback request (block 610). Subsequent to registering with Next Generation network 120 (as described with respect to the exemplary process of FIG. 4 above), UE 110 may, in accordance with existing procedures, enter one of two modes: a RRC connected mode, or a RRC idle mode. In the case of UE 110 being in the RRC connected mode, UE 110 generates a Service Request for MPS call establishment and inserts an MPS fallback request into the Service Request. For example, the Service Type value (e.g., octet 1) of the Service Request may include a new IE that indicates that Next Generation network 120 supports MPS fallback. In one implementation, bits 4, 3, 2, and 1 of octet 1 of the Service Type value may be set to 1 1 0 0 to indicate that Next Generation network 120 supports MPS fallback from network 120 to 4G network 130. FIG. 7A illustrates UE 110-1 determining 700, based on the MPSSI and MPSFI received from Next Generation network 120, whether Next Generation network 120 supports MPS and supports MPS fallback. In the example shown, UE 110-1 determines that the MPSSI indicates that Next Generation network 120 does not support MPS, and that the MPSFI indicates that Next Generation network 120 supports MPS fallback. FIG. 7A further shows UE 110-1, when in an RRC connected mode (identified with a "1" within a circle), sends a Service Request 703 to Next Generation network 120 that includes a MPS fallback request.

Upon receipt of the Service Request message from UE 110, Next Generation network 120 performs, based on the MPS fallback request from the Service Request message, one of the following: 1) a handover procedure to 4G network 130; or 2) a RRC redirection procedure to the 4G network 130. 4G network 130 then establishes the MPS call (block 620). UE 110 may engage in the handover from Next Generation network 120 to 4G network 130 using existing handover procedures. Further, UE 110 may engage in RRC redirection from Next Generation network 120 to 4G network 130 using existing procedures. 4G network 130 may establish the MPS call from UE 110 via 4G network 130 to the called party using existing MPS procedures. FIG. 7A depicts Next Generation network 120, based on the MPS fallback request from the Service Request 703, performing 713 either 1) a handover procedure 715 from Next Generation network 120 to 4G network 130, or 2) a RRC redirection procedure 718 from Next Generation network 120 to 4G network 130. FIG. 7A also shows UE 110-1, subsequent to handover or RRC redirection to 4G network 130, engaging in the MPS call 720 via 4G network 130 instead of via Next Generation network 120.

Returning to block 605, if Next Generation network 120 supports MPS fallback (YES—block 605), and UE 110 is currently in an RRC idle mode, then UE 110 sends a RRC Setup Request message to Next Generation network 130 with the "Establishment Cause" in the message set equal to "MPS Priority Access" (block 625). UE 110 and Next Generation network 120 engage in RRC setup in accordance with existing procedures. Upon completion of RRC setup, UE 110 sends a Service Request message to the Next Generation network 120 for MPS call establishment, with the Service Request including a MPS fallback request (block 630). In the case of UE 110 being in the RRC idle mode, and RRC setup being complete, UE 110 generates a Service Request for MPS call establishment and inserts an MPS fallback request into the Service Request. For example, the UE 110 may, as described above with respect to block 610, insert a new IE in the Service Type value (e.g., octet 1) of the Service Request that indicates that Next Generation network 120 supports MPS fallback. As described above, bits 4, 3, 2, and 1 of octet 1 of the Service Type value may be set to 1 1 0 0 to indicate that Next Generation network 120 supports MPS fallback from network 120 to 4G network 130. Next Generation network 120, upon receipt of the Service Request message from UE 110, performs blocks 615 and 620, as already described above. FIG. 7A shows UE 110-1, when in an RRC Idle mode (identified with a "2" within a circle), sends a RRC Setup Request 705 to Next Generation network 120 where the Establishment Cause specifies "MPS priority access." FIG. 7A further shows UE 110-1 and Next Generation network 120 engaging in an RRC setup procedure 708, and UE 110-1 subsequently sending, once RRC setup is complete, a Service Request 710 to Next Generation network 120 that includes a MPS fallback request.

Figure 7B:
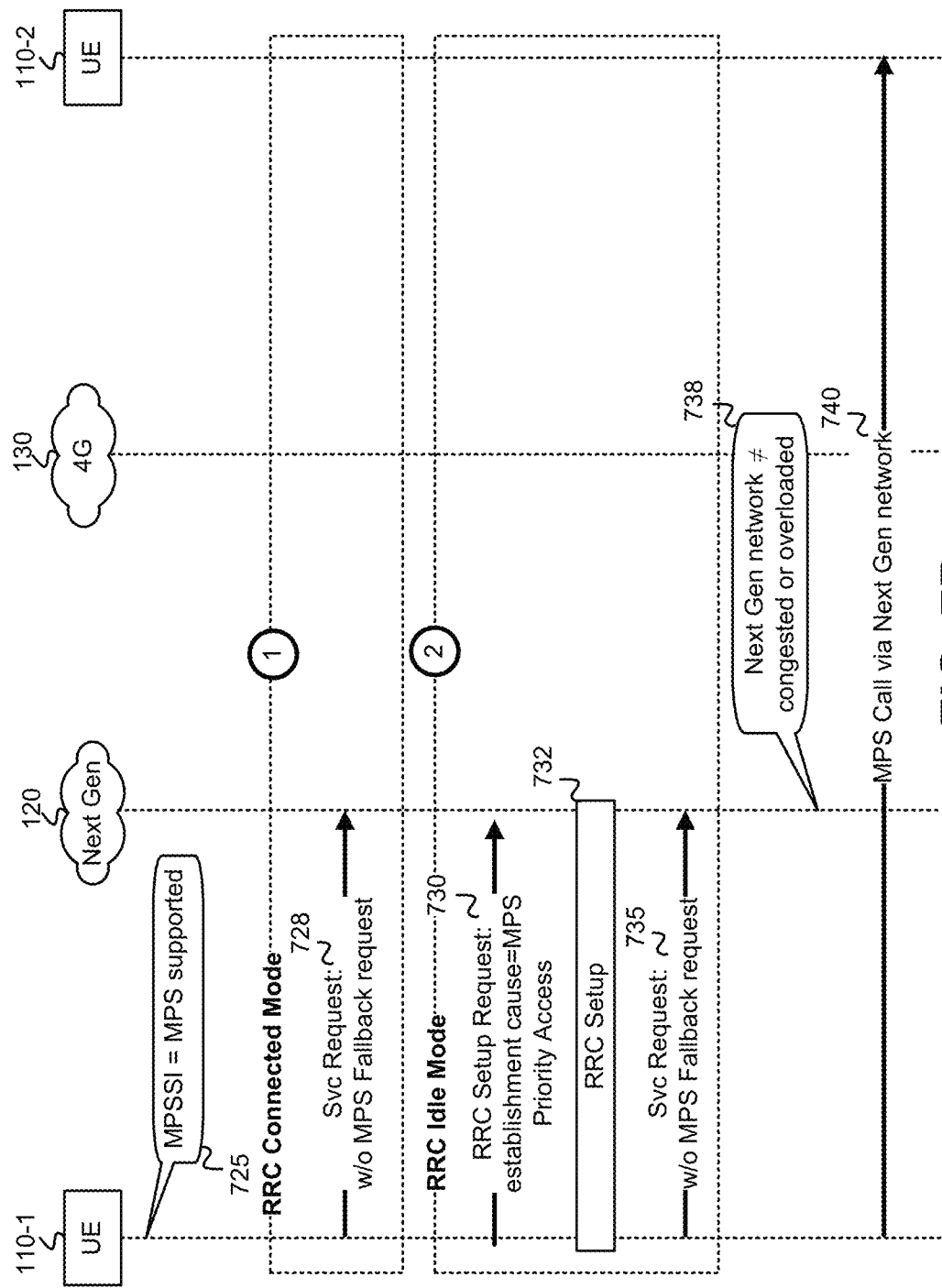

Returning to block 600, if Next Generation network 120 supports MPS services (YES—block 600), and if UE 110 is in a RRC connected mode, then UE 110 sends a Service Request message to Next Generation network 120 for MPS call establishment, without including a MPS fallback request (block 635). UE 110 generates a Service Request for MPS call establishment without inserting a MPS fallback request into the Service Request. UE 110, therefore, does not insert the new IE within the Service Type value of the Service Request, as previously described with respect to block 610. FIG. 7B shows UE 110-1, when in an RRC connected mode (identified with a "1" within a circle), sends a Service Request 728 to Next Generation network 120 that does not include a MPS fallback request.

Alternatively, if Next Generation network 120 supports MPS services (YES—block 600), and UE 110 is currently in a RRC idle mode, then UE 110 sends a RRC Setup Request to Next Generation network 120 with the "Establishment Cause" set equal to "MPS priority access" (block 640). Upon completion of the RRC setup, UE 110 sends a Service Request to Next Generation network 120 for MPS call establishment, without including a MPS fallback request (block 645). UE 110, therefore, generates a Service Request for MPS call establishment without, as previously described with block 610, inserting a MPS fallback request into the Service Request. FIG. 7B shows UE 110-1, when in an RRC Idle mode (identified with a "2" within a circle), sends a RRC Setup Request 730 to Next Generation network 120, where the Establishment Cause specifies "MPS priority access." FIG. 7B further shows UE 110-1 and Next Generation network 120 engaging in an RRC setup procedure 732, and UE 110-1 subsequently sending, once RRC setup is complete, a Service Request 735 to Next Generation network 120 that does not include a MPS fallback request.

Subsequent to blocks 635 or 645, a node/function in Next Generation network 120 determines if the network 120 is congested or overloaded (block 650). One or more nodes/functions in Next Generation network 120 may analyze various different network performance metrics (e.g., dropped calls, packet loss, latency, bandwidth vs. throughput, etc.) to determine whether congestion or overload conditions exist in Next Generation network 120 that may impact the MPS call/session. If network 120 is determined to be not congested or not overloaded (NO—block 650), then the Next Generation network 120 establishes a MPS call from the requesting UE 110 to the destination (block 655). Next Generation network 120 engages in existing procedures for establishing the MPS call from the UE 110 to the called party. FIG. 7B depicts an example of Next Generation network 120 determining that the network 120 is not congested or overloaded, and the MPS call/session subsequently being established 740 from UE 110-1 via Next Generation network 120 to the called UE 110-2.

If network 120 is determined to be congested or overloaded (YES—block 650), then a node/function in Next Generation network 120 determines if network 120 supports MPS fallback (block 660). If Next Generation network 120 does not support MPS fallback (NO—block 660), then Next Generation network 120 establishes an MPS call for the UE 110 (block 655) as network resources become available, or Next Generation network 120 rejects the MPS call with, for example, a rejection notification to the UE 110 (e.g., busy signal, automated message, etc.).

Figure 7C:
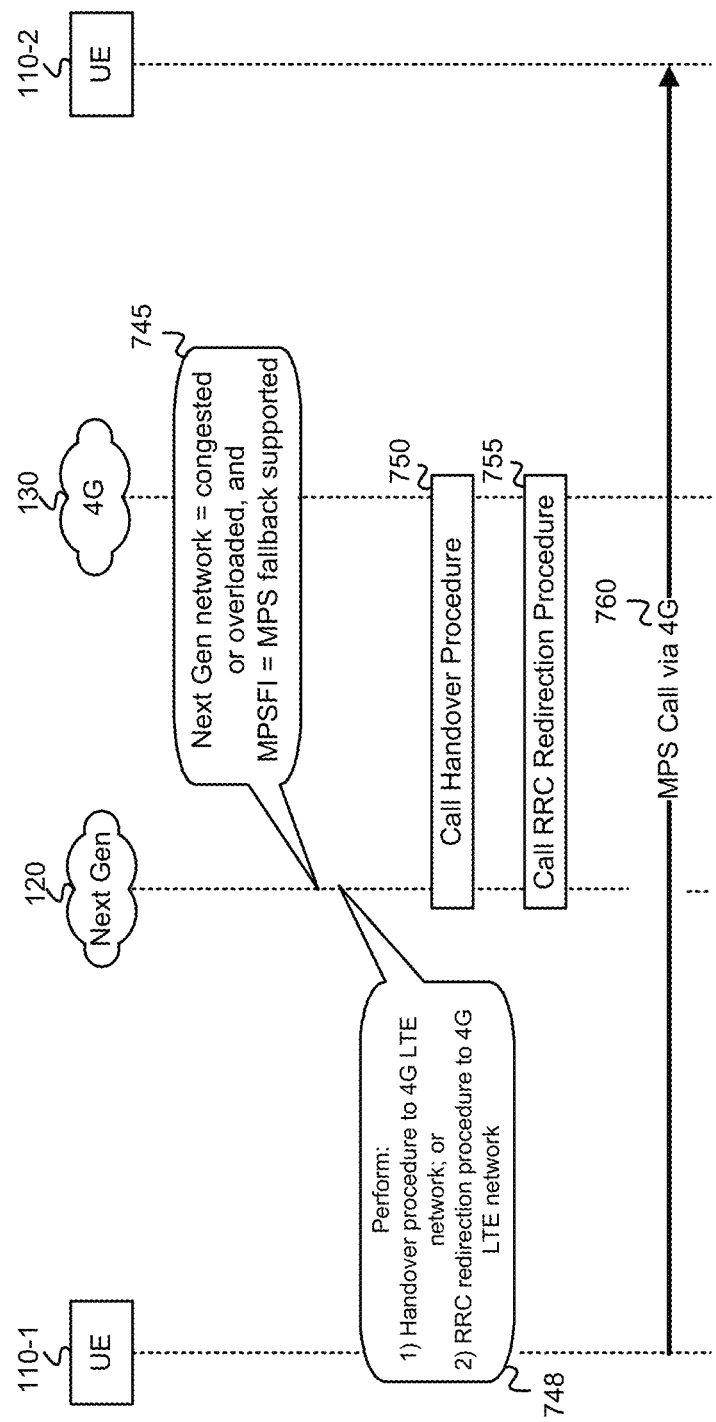

If Next Generation network 120 does support MPS fallback (YES—block 660), then Next Generation network 120 performs: 1) a handover procedure to 4G network 130; or 2) a RRC redirection procedure to 4G network 130 (block 665). UE 110 may engage in the handover from Next Generation network 120 to 4G network 130 using existing handover procedures. Further, UE 110 may engage in RRC redirection from Next Generation network 120 to 4G network 130 using existing procedures. After completion of the handover or RRC redirection procedure, 4G network 130 establishes the MPS call for the requesting UE 110 (block 670). 4G network 130 may establish the MPS call from UE 110 via 4G network 130 to the called party using existing MPS procedures. FIG. 7C depicts an example of Next Generation network 120 determining 745 that the network 120 is congested or overloaded so as to impact the MPS call/session and determining that the network 120 supports MPS fallback. FIG. 7C shows Next Generation network 120 performing 748 either 1) a handover procedure 750 from Next Generation network 120 to 4G network 130, or 2) a RRC redirection procedure 755 from Next Generation network 120 to 4G network 130. FIG. 7C also shows UE 110-1, subsequent to handover or RRC redirection to 4G network 130, engaging in the MPS call 760 via 4G network 130 instead of via Next Generation network 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 6A, and 6B, and sequences of operations, messages, and data flows with respect to FIGS. 5, 7A, 7B, and 7C, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 315) of a device. A non-transitory storage medium includes one or more of the storage mediums described in relation to memory/storage 320/340. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by one or more devices in a Next Generation network, a Registration Request from a User Equipment device (UE);
sending, in response to the Registration Request to the UE from the one or more devices in the Next Generation network, a Multimedia Priority Services (MPS) Support Indicator (MPSSI) that indicates whether the Next Generation network currently supports MPS sessions, and an MPS fallback indicator (MPSFI) that indicates whether the Next Generation network currently supports MPS fallback to a Fourth Generation (4G) network during MPS sessions;

receiving, from the UE by the one or more devices in the Next Generation network subsequent to the UE Registration Request, a Service Request for establishing a MPS session;

determining, by the one or more devices in the Next Generation network, whether the Service Request includes an information element (IE), inclusion of which is based on the MPSSI and the MPSFI, and which indicates that the Next Generation network supports the MPS network fallback, from the Next Generation network to the 4G network during MPS sessions; and selectively causing, based on whether the Service Request includes the IE that indicates that the Next Generation network supports MPS network fallback, the MPS session to be established either via the 4G network or via the Next Generation network.

2. The method of claim 1, wherein the Next Generation network does not support MPS and wherein the Service Request includes the IE that indicates that the Next Generation network supports MPS network fallback.

3. The method of claim 1, wherein the Next Generation network supports MPS and wherein the Service Request does not include the IE that indicates that the Next Generation network supports MPS network fallback.

4. The method of claim 3, further comprising:
determining, by the one or more devices, if the Next Generation network is congested or overloaded; and
selectively performing one of:
causing, by the one or more devices if the Next Generation network is determined to be not congested or not overloaded, the Next Generation network to establish the MPS session, or
causing, by the one or more devices if the Next Generation network is determined to be congested or overloaded, establishment of the MPS session via the 4G network by performing one of a handover procedure from the Next Generation network to the 4G network, or a Radio Resource Control (RRC) redirection procedure from the Next Generation network to the 4G network.

5. The method of claim 1, wherein the MPS session comprises a Wireless Priority Service (WPS) session or a Government Emergency Telecommunications Service (GETS) session.

6. The method of claim 1, wherein the Next Generation network comprises a Fifth Generation (5G) network and wherein the one or more devices execute at least one of an Access and Mobility Management Function (AMF), a Session Management Function (SMF), or a User Plane Function (UPF).

7. The method of claim 1, wherein the new IE comprises specific bits inserted into in an octet of a Service Type value of the Service Request.

8. The method of claim 1, wherein causing the MPS session to be established further comprises:
causing, if the Service Request includes the IE that indicates that the Next Generation network supports MPS network fallback, the MPS session to be established via the 4G network by performing one of:
a handover procedure from the Next Generation network to the 4G network, or
a Radio Resource Control (RRC) redirection procedure from the Next Generation network to the 4G network.

9. The method of claim 8, wherein causing the MPS session to be established further comprises:

causing, if the Service Request does not include the IE that indicates that the Next Generation network supports MPS network fallback, the MPS session to be established via the Next Generation network.

10. One or more device in a Next Generation network, comprising:
one or more communication interfaces configured to:
receive a Registration Request from a User Equipment device (UE),
send, to the UE in response to the Registration Request, a Multimedia Priority Services (MPS) Support Indicator (MPSSI) that indicates whether the Next Generation network currently supports MPS sessions, and an MPS fallback indicator (MPSFI) that indicates whether the Next Generation network currently supports MPS fallback to a Fourth Generation (4G) network during MPS sessions, and
receive, from the UE subsequent to the Registration Request, a Service Request for establishing a MPS session; and
one or more processing units configured to:
determine whether the Service Request includes an information element (IE), inclusion of which is based on the MPSSI and the MPSFI, and which indicates that the Next Generation network supports the MPS network fallback, from the Next Generation network to the 4G network for the MPS session during MPS sessions, and
selectively cause, based on whether the Service Request includes the IE that indicates that the Next Generation network supports MPS network fallback, the MPS session to be established either via the 4G network or via the Next Generation network.

11. The one or more devices in the Next Generation network of claim 10, wherein the Next Generation network does not support MPS and wherein the Service Request includes the IE that indicates that the Next Generation network supports MPS network fallback.

12. The one or more devices in the Next Generation network of claim 10, wherein the Next Generation network supports MPS and wherein the Service Request does not include the IE that indicates that the Next Generation network supports MPS network fallback.

13. The one or more devices in the Next Generation network of claim 12, wherein the one or more processing units are further configured to:
determine if the Next Generation network is congested or overloaded; and
selectively perform one of:
cause, if the Next Generation network is determined to be not congested or not overloaded, the Next Generation network to establish the MPS session, or
cause, if the Next Generation network is determined to be congested or overloaded, establishment of the MPS session via the 4G network by performing one of a handover procedure from the Next Generation network to the 4G network, or a Radio Resource Control (RRC) redirection procedure from the Next Generation network to the 4G network.

14. The one or more devices in the Next Generation network of claim 10, wherein the MPS session comprises a Wireless Priority Service (WPS) session or a Government Emergency Telecommunications Service (GETS) session.

15. The one or more devices in the Next Generation network of claim 10, wherein the Next Generation network comprises a Fifth Generation (5G) network and wherein the one or more devices execute at least one of an Access and Mobility Management Function (AMF), a Session Management Function (SMF), or a User Plane Function (UPF).

16. A non-transitory storage medium storing instructions executable by a Next Generation network device with one or more processors, wherein execution of the instructions cause the Next Generation network device to:
- receive a Registration Request from a User Equipment device (UE);
- send, to the UE in response to the Registration Request, a Multimedia Priority Services (MPS) Support Indicator (MPSSI) that indicates whether a Next Generation network currently supports MPS sessions, and an MPS fallback indicator (MPSFI) that indicates whether the Next Generation network currently supports MPS fallback to a Fourth Generation (4G) network during MPS sessions;
- receive, from the UE subsequent to the UE Registration Request, a Service Request for establishing a MPS session;
- determine whether the Service Request includes an information element (IE), inclusion of which is based on the MPSSI and the MPSFI, and which indicates that the Next Generation network supports the MPS network fallback, from the Next Generation network to the 4G network during MPS sessions; and
- selectively cause, based on whether the Service Request includes the IE that indicates that the Next Generation network supports MPS network fallback, the MPS session to be established either via the 4G network or via the Next Generation network.

17. The non-transitory storage medium of claim 16, wherein the Next Generation network does not support MPS and wherein the Service Request includes the IE that indicates that the Next Generation network supports MPS network fallback.

18. The non-transitory storage medium of claim 16, wherein the Next Generation network supports MPS and wherein the Service Request does not include the IE that indicates that the Next Generation network supports MPS network fallback.

19. The non-transitory storage medium of claim 18, wherein execution of the instructions further causes the Next Generation network device to:
- determine if the Next Generation network is congested or overloaded; and
- selectively perform one of:
  - cause, if the Next Generation network is determined to be not congested or not overloaded, the Next Generation network to establish the MPS session
  - cause, if the Next Generation network is determined to be congested or overloaded, establishment of the MPS session via the 4G network by performing one of a handover procedure from the Next Generation network to the 4G network, or a Radio Resource Control (RRC) redirection procedure from the Next Generation network to the 4G network.

20. The non-transitory storage medium of claim 16, wherein the Next Generation network comprises a Fifth Generation (5G) network and wherein the Next Generation network device executes at least one of an Access and Mobility Management Function (AMF), a Session Management Function (SMF), or a User Plane Function (UPF).

* * * * *